United States Patent [19]

Lemstra

[11] Patent Number: 5,066,755
[45] Date of Patent: Nov. 19, 1991

[54] NOVEL IRRADIATED POLYETHYLENE FILAMENTS TAPES AND FILMS AND PROCESS THEREFOR

[75] Inventor: Pieter J. Lemstra, Brunssum, Netherlands

[73] Assignee: Stamicarbon B.V., Geleen, Netherlands

[21] Appl. No.: 302,352

[22] Filed: Mar. 2, 1989

Related U.S. Application Data

[63] Continuation-in-part of Ser. No. 61,672, Jun. 15, 1987, abandoned, which is a continuation of Ser. No. 705,284, Feb. 25, 1985, abandoned, which is a continuation-in-part of Ser. No. 621,767, Jun. 18, 1984, abandoned, and a continuation-in-part of Ser. No. 161,424, Feb. 24, 1988, abandoned, which is a continuation of Ser. No. 20,702, Mar. 2, 1987, abandoned, which is a continuation of Ser. No. 822,409, Jan. 3, 1986, abandoned.

[30] Foreign Application Priority Data

| May 11, 1984 | [NL] | Netherlands | 8401518 |
| Aug. 25, 1984 | [NL] | Netherlands | 8402600 |
| Sep. 28, 1984 | [NL] | Netherlands | 8402965 |
| Oct. 5, 1986 | [EP] | European Pat. off. PCT/EP85/00223 | |

[51] Int. Cl.$^5$ .................... D01F 6/04; D01D 5/12
[52] U.S. Cl. .................... 526/348.1; 526/352; 428/364; 264/22; 264/205; 264/203; 264/210.2; 264/210.1; 264/210.4; 264/210.8; 264/211.15; 264/211.16; 264/211.18; 264/211.19
[58] Field of Search ............ 264/22, 204, 205, 203, 264/210.2, 210.1, 210.4, 210.8, 211.15, 211.16, 211.18, 211.19; 428/364; 526/352, 348.1

[56] References Cited

U.S. PATENT DOCUMENTS

| 2,763,609 | 9/1956 | Lewis et al. | 264/22 |
| 2,877,500 | 3/1959 | Rainer et al. | 264/22 |
| 2,908,545 | 10/1959 | Teja | 264/22 |
| 2,956,899 | 10/1960 | Cline | 264/22 |
| 3,003,304 | 10/1961 | Rasmussen | 264/22 |
| 3,022,543 | 2/1962 | Baird, Jr. et al. | 428/36 |
| 3,148,020 | 9/1964 | Graham | 264/22 |
| 4,100,827 | 7/1978 | Flemming | 138/149 |
| 4,226,905 | 10/1980 | Harbourne | 264/22 |
| 4,269,947 | 5/1981 | Inata et al. | 264/22 |
| 4,310,367 | 1/1982 | Berejka | 264/230 |
| 4,310,478 | 1/1982 | Balslev et al. | 264/22 |
| 4,344,908 | 8/1982 | Smith et al. | 264/203 |
| 4,356,133 | 10/1982 | Cowen et al. | 264/22 |
| 4,361,606 | 11/1982 | Butler et al. | 264/22 |
| 4,411,854 | 10/1983 | Maurer et al. | 264/205 |
| 4,413,110 | 11/1983 | Kavesh et al. | 524/108 |
| 4,422,933 | 12/1983 | Sverre et al. | 210/222 |
| 4,430,383 | 2/1984 | Smith et al. | 428/364 |
| 4,436,689 | 3/1984 | Smith et al. | 264/205 |
| 4,442,233 | 4/1984 | Lohman et al. | 264/22 |
| 4,469,742 | 9/1984 | Oberle et al. | 428/215 |
| 4,551,380 | 4/1985 | Schoenberg | 428/516 |

FOREIGN PATENT DOCUMENTS

| 0055510 | 7/1982 | European Pat. Off. . |
| 0077590 | 4/1983 | European Pat. Off. . |
| 2114649 | 6/1972 | France . |
| 1324919 | 7/1973 | United Kingdom . |
| 1603638 | 11/1981 | United Kingdom . |
| 2135632 | 9/1984 | United Kingdom . |
| 2139142 | 11/1984 | United Kingdom . |

OTHER PUBLICATIONS

Bohm et al., "The Radiation Chem of Elastomers & Its Applications", Rubber Chem and Tech, vol. 55(1982), pp. 575-668.

J. de Boer and A. J. Pennings, Crosslinking of Ultra-High Strength Polyethylene Fibers by Means of γ-Radiation, Polymer Bulletin, 1981, vol. 5, pp. 317-324.

Ethylene Polymers, Encyclopedia of Polymer Science and Technology, 1967, vol. 6, pp. 307-310.

Deformation-Induced Structural Developments of Ultra-High Molecular Weight Polyethylene, N. A. J. M. van Aerle, Technical University of Eindhoven, The Netherlands, May 1989.

Primary Examiner—Hubert C. Lorin
Attorney, Agent, or Firm—Cushman, Darby & Cushman

[57] ABSTRACT

Novel gel-spun, irradiated and drawn ultra high strength high molecular weight and at least partially cross-linked and/or branched polyethylene filaments, tapes and films, exhibiting a combination of substantially lower creep rates, very high heat shrink characteristics and high abrasion resistance properties than corresponding but non-irradiated articles, and with a process for making the same.

25 Claims, 8 Drawing Sheets

0 MRAD
M = 200 X

T = 23 °C

T = 164 °C

5 MRAD
M=200 X

T=23 °C

T=170 °C

T=220 °C

NOVEL IRRADIATED POLYETHYLENE FILAMENTS TAPES AND FILMS AND PROCESS THEREFOR

RELATED APPLICATIONS

This application is a continuation-in-part of U.S. Pat. Ser. No. 61,672, filed June 15, 1987 now abandoned which is a continuation of U.S. Pat. Ser. No. 06/705,284, filed Feb. 25, 1985, now abandoned, which is in turn a continuation-in-part of U.S. Pat. Ser. No. 06/621,767 filed June 18, 1984; now abandoned, and a continuation-in-part of U.S. Pat. Ser. No. 07/161,424 filed Feb. 24, 1988 now abandoned which is a continuation of U.S. Pat. Ser. No. 07/020,702, filed Mar. 2, 1987, now abandoned, which is a continuation of U.S. Pat. Ser. No. 06/822,409 filed Jan. 3, 1986, now abandoned the disclosures of which are incorporated herein by reference.

This invention relates to a novel process for preparing novel polyethylene filaments, films and tapes having unique combined properties of high tensile strength and high modulus as well as low creep, along with a very high shrink ratio when heated coupled with very high abrasion resistance and other characteristics. The process particularly involves spinning or extruding a solution of high-molecular weight linear polyethylene, and cooling the spun or extruded material to transform the same into a gel-state, and irradiating the material while in said gel-state, and drawing or stretching the gel-state article during of after irradiation. The invention further provides novel filaments, films and tapes obtained from this process.

In the following description of the invention, will first set forth principle descriptions and refer to the production of filament embodiments, but as will be seen film and tape embodiments will also be described and, as those skilled in the art will understand, in much of the text the words filament, tape or film may be read for each other in regard to the principles of the process.

BACKGROUND OF THE INVENTION

It has now become generally known in the art that filaments may be prepared from high molecular weight polyethylene which filaments have a very high tensile strength, for instance higher than 1.2 GPa, and a very high modulus of, for instance, higher than 20 GPa, utilizing dilute solutions of high-molecular weight linear polyethylene and the technique known as gel-spinning or gel-extrusion. See, for instance, U.S. Pat. Nos. 4,344,908, 4,422,933, and 4,430,383. In such known processes a solution of up to 20 wt.% polyethylene having a weight-average molecular weight of at least $4 \times 10^5$, preferably at least $8 \times 10^5$, may be spun through a spinning aperture to form a filament at a temperature above the gelling temperature for the solution. This filament is then subsequently cooled to below the gelling temperature, after which the gel filament thus formed is stretched (i.e. drawn) at an elevated temperature, but below its melting point, either before or after complete or partial removal of the solvent. This technique is now sometimes referred to as gel-spinning.

Although the filaments resulting from these known processes have excellent mechanical properties in terms of tensile strength and modulus, it has been found desirable to provide polyethylene filaments having, along with other advantageous properties as described hereinbelow, a reduced creep of lower values than have been obtained by prior techniques from comparable high molecular weight polyethylene starting material. Creep is known as the property observed by measuring deformation particularly elongation, of the filament when it is subjected to prolonged loading. Filaments having a higher creep value are less suitable for uses in which the material is exposed to prolonged loads, even if such loads are of a low level, particularly in the case of polyethylene.

In this field, it will be understood and appreciated that to produce the desired high strength, high modulus, fibers or filaments, tapes and films, a number of factors contribute to the ultimate characteristics of the article. To some extent these factors may be regarded as "chemical" in the sense that they would relate to, first of all, the molecular weight (consequently molecular length) of the polymeric material itself, and also with respect to the molecular structure of the polymer (i.e. whether it is linear, or has substantial branching, or whether it is cross linked). In addition, the molecular weight distribution characteristics of the polymer can also be considered as a "chemical" factor.

Other factors which can be considered might be viewed as "mechanical factors" in the following sense. It is of course well known and established that an oriented, i.e. anisotropic or crystalline, polymer will have potentially greater strength characteristics of the sort here under consideration than would an unoriented, non-crystalline or isotropic structure. The ultimate hypothetical strength of a polymer fiber on a theoretical basis, would be found in a structure involving fully parallel alignment of infinitely long polymer molecules so that, for instance, resistance to break would actually be measured by the strength of the chemical bond itself. While this theoretical situation is at the present level of technology unachievable in the ideal sense, the dramatic improvement in the strength of gel-spun filaments formed from ultra high molecular weight polyethylene, as compared to melt spun filaments, necessarily formed from lower molecular weight polymer material, at least in part derives from the exceptionally good alignment of very long polymer chains which can be achieved.

A key factor is of course achieving alignment along the linear dimension of the filament of the long high molecular weight polymer molecules. Also, in this condition and situation the polymer will be highly crystalline.

Accordingly, the ability of a starting polymeric material to be "drawn" or stretched after extrusion or spinning through an aperture or orifice is of great importance in the production of high strength filaments because of the molecular alignment which is thereby induced in the filamentary structure. Similar advantageous molecular alignment also occurs in the stretching of tapes and/or the mono- or bi-axial stretching of films.

Normally it is considered that a spun product or an extruded will have improved drawing or stretching characteristics, to achieve the enhanced orientation (consequently strength), if the filament (tape or film) is formed from linear, relatively unbranched, and non-cross-linked polymeric substances.

In the commercial production on a practical basis, of such materials, another equally important factor must be considered and that is the processing time and ease of spinning or extruding of the materials involved. Owing to the inherent nature of high molecular weight linear polymers and their entanglement in an unoriented manner when present in a liquid state (either as a melt or as a solution), it has been well known that as the molecular weight and solution concentration increases, the viscosity in such liquid state of such polymers rapidly increases. Indeed, as a practical matter, this increase in viscosity imposes a general upper limit on the molecular weight of the polymer which may be employed in the formation of spun or extruded articles such as filaments, tapes or film. Equipment simply cannot be built, or at least cannot be operated effectively, in practical terms, when the viscosity of the material to be extruded becomes too high.

Another factor, in addition to the molecular weight per se would be the degree of branching or cross-linking which might be present in the polymer material—excessive branching and/or cross linking generally being regarded as further increasing the viscosity of the polymer material in the liquid state.

Of course, in the general desire and goal to produce useful articles of commerce such as filaments, fibers, tapes and film, from high molecular weight materials, good chemical and mechanical stability of the ultimate commercial article is also highly desired, with such specific properties being dictated according to particular desired ultimate uses. In this respect, high molecular weight polyethylene possesses many desirable characteristics such as a relative inertness, resistance to deterioration on exposure to ultra violet light, hydrophobicity, and the like. It was, however, only with the discovery of the gel-spinning methods as described in the above-mentioned U.S. patents that polyethylene filaments of a desirably tensile strength and modulus could in fact be made in any practical terms. Nonetheless, even such products, good as they are, are less than fully satisfactory due to, for instance, less than desirable creep characteristic, as described above.

In order to develop an improved combination of properties and characteristics, all of the above factors in combination must be taken into consideration.

In accordance with the present invention, a technique of irradiation of the spun or extruded material, while still predominantly in the gel state, is employed in order to achieve such an improved combination of characteristics. As will be described hereinbelow, the present invention results from the remarkable discovery that irradiation of the high molecular weight polyethylene material in the gel state results in just such a combination of properties which is rather contrary to what might have been expected from prior art experiences and observations from the irradiation of polyethylene itself especially oriented, crystallized polyethylene. Generally, it has been observed that upon irradiation of oriented high molecular weight polyethylene a degradation of the polymer molecule occurs as a result of chain scission, with apparently little if any cross-linking (or molecular weight enhancement) occurring. The evidence which will be described below with regard to the present invention indicates that, to the contrary, when the polyethylene material is irradiated in the extruded gel state condition, there is relatively little if any degradation of molecular weight. Instead, cross-linking and/or long chain branching of the polyethylene molecules is induced. As the above discussion of the prior art shows, it would also have been expected that inducement of such cross linking and/or long chain branching would be disadvantageous for the objective of forming high strength drawn (i.e. oriented) polyethylene articles such as filaments, tapes or films. Surprisingly, however, it has been found in this invention that the irradiated gel state filament retains excellent drawability characteristics and that the drawn (or stretched) filament (or tape or film) may still be drawn (or stretched) to remarkable degrees with achievement of the necessary orientation, and resulting crystallinity, of the final article whereby the ultra high strength tensile and modulus characteristics are retained.

Along with the retention of such desirable characteristics, the new and novel products also possess a substantially lower "creep rate" as will be explained hereinafter, along with a very high shrink ratio coupled with very high abrasion resistance. Indeed, with tapes and films, markedly reduced fibrillation characteristics are also observed.

It is believed it will be appreciated that this novel combination of properties and characteristics must principally derive from a novel "chemical" structure in the polymer molecule as induced by the irradiation technique, i.e. the ultra long chain branching and/or cross linking which has occurred has at least substantially transformed the original linear polyethylene into a different chemical molecular structure. At least, that is the best presently known explanation for the exceptional characteristics exhibited by the products produced by the present invention, as will now be described hereinbelow.

SUMMARY DESCRIPTION OF THE INVENTION

The present invention now provides in one embodiment an improved process for the production of novel polyethylene filaments having a combination of high tensile strength and high modulus, obtained from gel spinning solution of high-molecular linear polyethylene, which novel filaments exhibit an extremely low creep in combination with other properties. In other embodiments, novel tape and film-dimensioned articles are provided.

More specifically, this invention now provides novel gel-spun, irradiated and drawn, and at least partially cross-linked and/or branched ultra high strength polyethylene article in the form of a film, tape or fiber and exhibiting the following characteristics in combination (1) a tensile strength of at least $2.3-1.3 \times 10^{-2}D)$ GPa where D is the thickness or diameter of uniaxially oriented tapes and filaments, in $\mu$m, or a tensile strength of at least 0.5 GPa in case of biaxially drawn films;

(2) a modulus of at least 30 GPa;

(3) a xylene insoluble content of at least 25%;

(4) an at least 20% retained peak area under the DSC main melting point curve upon second heating after an initial heating about 170° C.;

(5) a retention of a retractive force plateau after reaching thermal equilibrium upon heating the fiber to a temperature above about 170° C.; and (6) retention, after heating reaching thermal equilibrium above 170° C. under restraint, of an X-ray diffraction pattern substantially corresponding to oriented, crystallized polyethylene.

Advantageously, the filaments will have a tensile strength of at least 2.1 GPa, and a modulus of at least 60 GPa; the tapes will have a tensile strength of at least 60 GPa, and the mono-axially drawn films will have a tensile strength of at least 1.5 GPa and a modulus of at least 1.0 GPa and a modulus of at least 50 GPa. Illustrating the invention with reference to filaments, the novel process of the present invention comprises forming a solution of linear polyethylene having a weight-average molecular weight of at least $4 \times 10^5$, advantageously with at least about 80 wt. % solvent (for filaments and tapes of high drawability and high strength and modulus), spinning or extruding filaments from such solution at a temperature above the gelling temperature of the solution, and thereafter cooling the spun or extruded filament to below the gelling temperature. The resulting gel filament is thereafter subject to substantial irradiation either before or during its drawing or stretching and either before or after at least partial removal of the solvent (depending upon the susceptibility of the solvent itself to irradiation).

Surprisingly, it has now been found that there is an essential difference between the irradiation of the gel filaments before or during the stretching operation, according to the present invention, as against the irradiation of the filaments when in a state in which the polymer molecules are already predominantly oriented, i.e. after a substantial stretching or drawing operation.

Irradiation of the gel filaments before or during the stretching, according to this invention, is therefore understood to mean the irradiation of the gel filaments in a state and at a stage, after spinning, but prior to the polymer molecules in said gel state having been predominantly oriented.

This invention also provides in another embodiment a process for preparing novel tapes from polyethylene having a weight-average molecular weight of at least $4 \times 10^5$, and having in combination a high tensile strength and high modulus along with low creep and low fibrillation properties. In this embodiment, a solution of linear polyethylene advantageously having a weight-average molecular weight of at least $4 \times 10^5$ advantageously with at least 80 wt. % solvent (again, for highest strength and modulus) is transformed at a temperature above the gelling temperature of the solution, into a tape-shaped article, as for instance by spinning or extruding the solution through a slit-shaped aperture, the resulting tape is then cooled to below the gelling temperature. Thereafter the resulting gel tape is then subjected to irradiation, either before or during its stretching or drawing, at an elevated temperature, below its melting point, whether or not after at least partial removal of the solvent.

Surprisingly, it has been found that there is an essential difference between the irradiation of the gel tapes before or during the stretching, according to the present invention, and the irradiation of the tapes after the polymer molecules therein are already predominantly oriented, i.e. after the stretching.

Irradiation of the gel tapes before or during the stretching is therefore, according to this invention, understood to mean the irradiation of the gel tapes in a gel-state in which the polymer molecules are predominantly not yet oriented.

In a further embodiment, this invention also provides a process for preparing novel films of polyethylene having a weight-average molecular weight of at least $4 \times 10^5$ and having a combination of high tensile strength and high modulus together with a low creep and low fibrillation, in which process a solution of linear polyethylene with up to at least 60 wt % solvent is transformed at a temperature above the gelling temperature of the solution into a film-shaped article, which is then cooled to below the gelling temperature. The resulting gel-state film thereafter is subjected to irradiation before or during its stretching, either bi-axial or mono-axial, and at an elevated temperature below the melting point, whether or not after at least partial removal of the solvent.

Film is understood to mean herein a product in the form of a thin layer, notably less than 0.5 mm thick, with a width to thickness ratio of at least about 100, preferably at least 1000.

Surprisingly, it has also been found that there is an essential difference between the irradiation of the gel films before or during the stretching according to the present invention and the irradiation of the films after the polymer molecules are already predominantly oriented, i.e. after either bi-axial or mono-axial stretching.

Irradiation of the gel films before or during the stretching is therefore, according to the invention, understood to mean the irradiation of the gel films in a gel-state in which the polymer molecules are predominantly not yet oriented.

Although applicants do not wish to restrict the invention by the presentation of a theoretical explanation, and although the relative phenomena are not yet fully understood, it is tentatively believed that the essential point of effecting the irradiation before or during the stretching stage lies in thus treating the filaments, films or tapes while in a state where the molecular chains still predominantly appear in a lamellar structure, such that cross-linking reactions between the molecular chains can occur while mainly in the unoriented state.

It has now been found that by employing the process according to this invention the novel filaments, films and tapes obtained have a unique combination of properties, particularly a very much reduced creep value, as compared with non-irradiated filaments, films or tapes, while surprisingly, the stretchability of the gel article itself is at most only slightly affected. Thus, after stretching (i.e. drawing) the tensile strength and modulus values of the novel filaments, films and tapes will be maintained at a high desired level.

In addition, the filaments, tapes, films, ribbons, tapes, tubes, bars produced by this invention with a draw ratio of at least 15 have very high shrink ratios when heated and also exhibit very high abrasion resistance characteristics. Those features of the invention are particularly advantageous for tubes and tapes and fabrics woven from the filaments.

While the same principles are believed to apply in the same manner to those embodiments of the invention wherein tapes and films are made, but for simplicity of discussion, the following text will first focus on the fiber or filament embodiment of this invention.

The irradiation of polyethylene, in and of itself, is, of course, already known. See for instance "The Radiation Chemistry of Macromolecules" by Dole M. published by Academic Press (New York) which describes the irradiation of polyethylene melts by means of, for instance, electron radiation whereby cross-linking is said to occur. It has, however, also been known to the art that in such an irradiation process the stretchability of the then irradiated polyethylene, and consequently, the strength of the resulting filaments are severely diminished; see, for instance, Volume II (1973), at pages 289 and 293 of the above said text.

It has also been known in the art to irradiate polyethylene fibers obtained after stretching or drawing. However, the mechanical properties of the fibers from that process are also known to deteriorate very badly. In particular, after such an irradiation the tensile strength is decreased by as much as 40%, see for instance Polymer Bulletin 5 (1981), at pages 317–324.

In contrast to those prior art experiences, and contrary to what would have therefore been expected the present technique of irradiation leads to novel fibers and filaments which retain their high tensile and high modulus values while also having beneficially low creep properties. In part, it appears that this unexpected advantageous combination of resulting properties may result from the circumstance that even though cross-linking of long-chain polyethylene molecules may have been induced by irradiation, the gel filament itself retains excellent drawability characteristics which is unexpected, even more so in that with the very high molecular weight polyethylenes here used a greater extent of cross-linking might be expected. See Charlesby and Pinner, Proc. Royal Soc. London, A249, 367 (1959).

Further, even though the irradiation operation may in part induce some deterioration in chain length, as in usually observed in the irradiation of polymers, this effect, if present, is evidently insufficient in the present procedure to cause a resulting general deterioration in properties; or at least the same is overcome by substantial contributions of desirable properties from the cross-linking and/or possible chain-lengthening or long-chain branching effects of such irradiation. As stated, however, the phenomena involved are not at present sufficiently understood to restrict the invention to any one particular theoretical explanation or hypothesis.

DETAILED DESCRIPTION OF THE INVENTION

Figure 1:
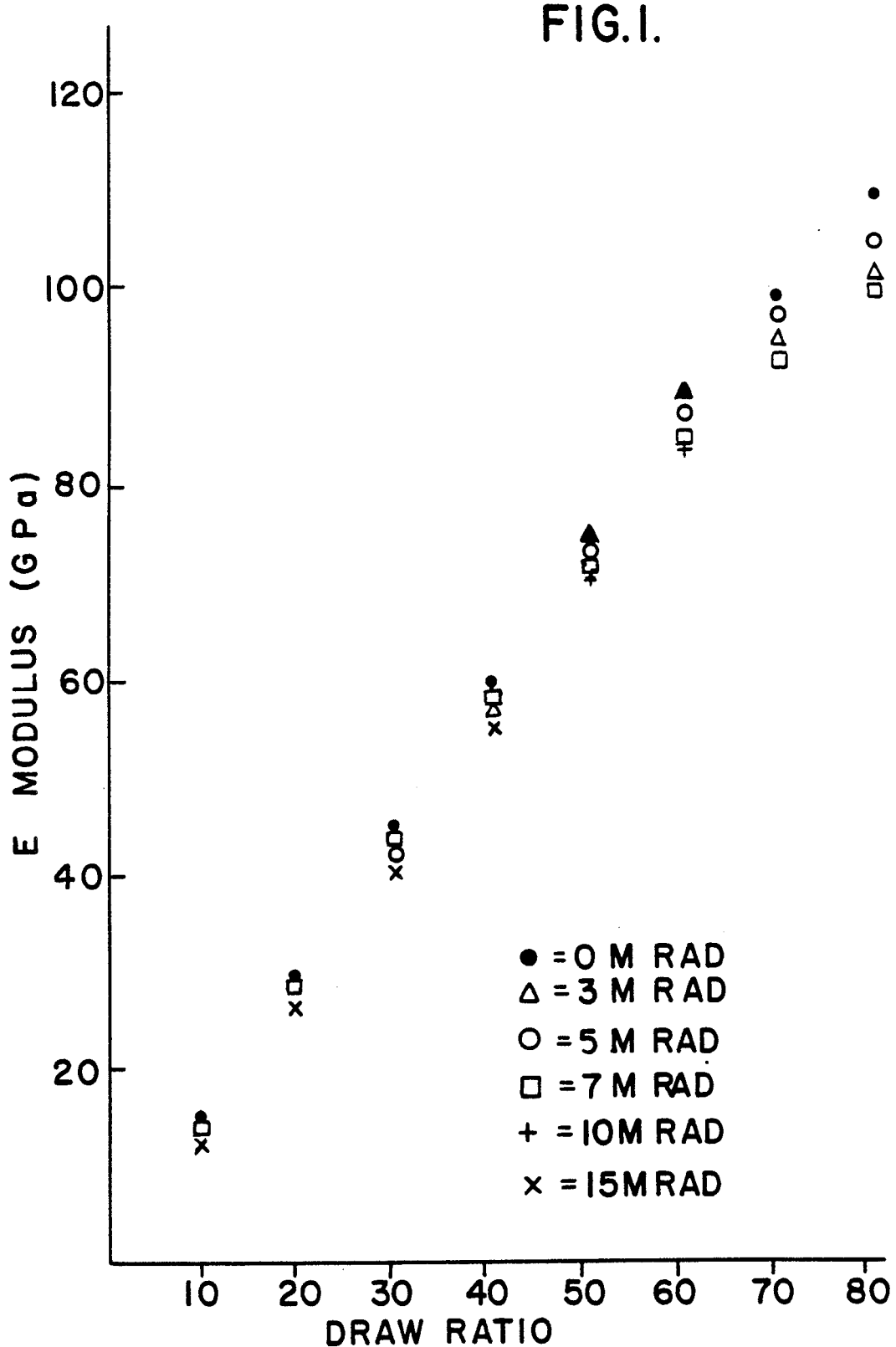
FIG. 1 shows a plot of E-Modulus of tapes.

In the present process the spun gel filament obtained after cooling is exposed to irradiation. For instance, this can be easily done by passing this filament under a radiation source or between two radiation sources.

The source of radiation may in the first place be an electron beam generator, but in principle a gamma radiation source may be used also. A survey of the customary and appropriate radiation sources and methods for use herein is given in Rubber Chemistry and Technology 55 (1982), pages 575–668.

The radiation intensity applied in this process may vary, depending in part on the diameter or thickness of the product to be irradiated, a higher intensity being employed generally with filaments having a larger diameter or a greater thickness. A suitable radiation dosage generally appears to be between 1 and 10 MRAD and preferably from about 3 to 7 MRAD.

The irradiation may be effected at reduced, elevated or at atmospheric pressure and may be carried out at room temperature or at a reduced or elevated temperature for the filament. Pressure and temperature need only be chosen so as not to disturb the gel-state of the filament, and, of course, so as to be below the melting point of the polyethylene itself. During the irradiation and/or between the irradiation and the drawing of the filaments, it is preferable to avoid the presence of an oxygen-containing environment, e.g. by using a nitrogen or inert gas atmosphere, especially if drawing does not immediately follow irradiation. The stretching or drawing step is therefore best effected either during the irradiation or immediately following the irradiation treatment.

The solvent-containing gel filament as obtained by cooling after spinning of the aforesaid solution can in principle itself be irradiated. However, it is also possible first to remove part or almost all of the solvent from this gel filament and to subject the resulting gel filament to irradiation.

Thus, overall, the present process starts with a dilute solution of a high-molecular weight linear polyethylene, generally having a weight-average molecular weight of at least $4 \times 10^5$, dissolved in any solvent suitable for this purpose. In this connection, the phrase high-molecular weight linear polyethylene is understood to include polyethylenes that may contain minor amounts, preferably up to 5 mol %, of one or more other copolymerized alkene monomers, such as propylene, butylene, pentene, hexene, 4-methylpentene, octene, etc., and which polyethylene preferably has at least one hundred, desirably 300, linear chain atoms between possible side-chains, especially side-chains of more than one carbon atom. The polyethylene may also contain minor amounts, preferably up to at most about 25 wt. %, of one or more other polymers, particularly an alkene-1-polymer such as polypropylene, polybutene or, for instance, a copolymer of propylene with a minor amount of ethylene.

The polyethylene employed may further also contain substantial amounts of a filler, as is described in U.S. Pat. No. 4,411,854. In the present process, it may also be advantageous to use a polyethylene whose weight-average/number-average molecular weight ratio is less than 5, as described in U.S. Pat. No. 4,436,689.

As the attainable moduli and tensile strengths of the spun and drawn filament have been found to increase generally as the polyethylene molecular weight increases, preference is given to using a polyethylene having a molecular weight of at least about $8 \times 10^5$.

However, as its molecular weight increases, the polyethylene is generally more difficult to process, i.e. the dissolution thereof in a suitable solvent will be more time-consuming and, at the same concentrations, the solutions will be more viscous. Accordingly, lower concentrations are, in general, utilized in practical applications but this may be at the expense of the process economics and efficiency. Therefore, in general, from these practical considerations at present, polyethylene will not be used having molecular weights higher than $25 \times 10^6$, even though the present process is also operable with higher molecular weights such as $25 \times 10^6$.

The weight-average molecular weights, $M_W$, can be determined according to the usual methods already known in the art, e.g. by gel permeation chromatography and light scattering.

In part, the polyethylene concentration in the solution may vary depending upon the nature of the solvent and the molecular weight of the polyethylene. Solutions having a concentration of up to or even more than about 20 wt. %, may be used, but particularly when using polyethylene with a very high molecular weight, for instance higher than about $1 \times 10^6$, the higher concentrations may be rather difficult to deal with on account of the high viscosity that develops, depending upon the spinning or extrusion technique employed. On the other hand, while the use of solutions of, for instance, down to or even less than 0.5 wt. can be used, this has the practical disadvantages of a loss of yield and an increase of costs for separating off and recovering solvent. Nonetheless, in general, drawability ratios for gel-state filaments and tapes are found to be higher when the solution concentration is lower, accordingly where higher modulus and tensile strength are desired, lower concentrations are preferably used, e.g. between 1 and 10 wt. %, more advantageously between 2 and 6 wt. %. Compare Smith, Lemstra and Booy, J. Polym. Sci. Phys. Ed. 19, 877 (1981).

If new co-developed extrusion spinning techniques are used, higher concentrations may more readily be employed. Solutions having a concentration of more than 50 % (wt), particularly when using a polyethylene with a very high molecular weight, for instance higher than $3 \times 10^6$, are rather difficult to deal with on account of high viscosity that occurs. On the other side, the use of solutions with polyethylene concentrations lower than, for instance, 0.5 % (wt) has the disadvantage of a loss of yield and an increase in the costs of separating off and recovering solvent.

Generally, a polyethylene solution will therefore be started from having a concentration between 2 and 30 % (wt), in particular 5-20 % (wt).

Preferably, however, the preparation of the solution and also the transformation of the solution into a shaped article is carried out in a screw extruder, especially a co-rotating twin-screw extruder, operated at a rotational speed of from about 30 to about 300 revolutions/minute, and equipped with conveying and mixing sections. Generally, herein a residence time of 0,5–45 minutes, a temperature above 90° C. and mechanical shear rates between 5 and 2000 m/sec$^{-1}$ are applied.

Under rapid cooling solutions of polyethylene materials will change into a gel in the said concentration range below a critical temperature (gel point). In, for instance, spinning and extrusion a solution must be used and the temperature must therefore be above this gel point.

The choice of the particular solvent is itself not critical to operate the process. Any suitable solvent can be used, such as either halogenated or non-halogenated hydrocarbons. In most solvents polyethylene can be dissolved only at temperatures of at least 90.C. In the spinning process, the space into which the filaments are spun is generally under atmospheric pressure. Low boiling solvents for the solution are therefore less desirable, because they may evaporate from the filaments so rapidly that they will act more or less as foaming agents and interfere with the desired structure of the filaments. Similarly, the pressure applied will in general be at least sufficient to avoid boiling of the solvent.

Under rapid cooling, solutions of polyethylene materials in the said concentration range will change into a gel below a critical temperature (i.e., the gel point). In spinning, a solution must be used and the temperature of the spinning must therefore be above this gel point.

During the operation of transformation into the shaped article the temperature of the solution is preferably at least about 100° C., advantageously at least 120° C., and with the boiling point of the solvent preferably at least 100° C. and specifically at least equal to the spinning or extrusion temperature. The solvent should not have a boiling point so high as to make it difficult for it to be evaporated or otherwise removed from the formed article, e.g., spun filaments. However, if a solvent extraction technique is employed, higher boiling (and/or higher melting point) solvents may be used, provided only that the solvent is a liquid at spinning/extrusion processing temperatures. Suitable solvents are aliphatic, cycloaliphatic and aromatic hydrocarbons having boiling points of at least 100° C. such as paraffins, paraffin waxes, xylenes, tetralin and decalin, and also halogenated hydrocarbons and other known solvents. On account of their lower cost, preference will generally be given for non-substituted hydrocarbons, which also include hydrogenated derivatives of aromatic hydrocarbons.

Further, the transformation temperature and the dissolution temperature must not be so high as to bring about substantial thermal decomposition of the polyethylene. These temperatures will therefore generally not exceed about 240° C.

Although for reasons of simplicity reference is made herein to spinning of filaments, it will be clear to the person skilled in the art that in the present process spinning heads with slit dies can be used also. This invention therefore not only contemplates spinning filaments having a more or less circular cross section, but also spinning through elongated openings to form tapes or films which may be produced in a similar manner. The essence of the invention is the manner in which the stretched structures are made, and irradiated, and the shape of the cross section is of minor importance.

The transformation of the solution into a tape- or film-dimensioned article can also be carried out in various ways, including by spinning through a spinneret having a slit-shaped aperture, or the solution can also be poured out on for instance a cylinder or roll, or it may be extruded, calendered or rolled out, and can be slit or otherwise divided or desired. Spinning is described in U.S. Pat. No. 4,344,908, U.S. Pat. No. 4,422,993, U.S. Pat. No. 4,430,383, U.S. 4,411,854, and U.S. Pat. No. 4,436,689.

After spinning, or otherwise being processed as just described, the spun product is cooled to a temperature below the gel point of the solution in any suitable manner. For instance, the spun product may be passed into a cooling fluid, gaseous or liquid, such as into a liquid bath or through a tunnel. While being cooled to below the gel point of the polyethylene solution, the polyethylene forms a gel. A filament tape or film composed of this polyethylene gel has sufficient mechanical strength for further processing, for instance by being carried over guides, rollers and the like, such as is customary in the spinning techniques.

According to this invention, the gel filament (or gel tape or film) thus obtained is now subsequently irradiated. At this stage, the gel may still contain substantial amounts of solvent, even up to amounts nearly equal to that present in the polyethylene solution as spun. Such is the case if the solution is transformed and cooled under conditions that do not promote or induce any substantial evaporation or other removal of the solvent, for instance by passing the filament into a liquid, e.g., water, bath.

The irradiation can be done by passing the article under a radiation source or between two or more radiation sources.

The radiation source applied may in the first place be an electron beam donor, but in principle a gamma radiation source may be used also. A survey of the customary radiation sources and methods is given in Rubber Chemistry and Technology 55 (1982) pages 575-668.

The radiation intensity applied in the process may vary, depending in part on the diameter or thickness of the product to be irradiated, a higher intensity being applied generally with products having a greater thickness or a larger diameter. The chosen radiation dosage is generally between 1 and 10 MRAD and preferably 3-7 MRAD.

The irradiation may be effected at reduced, elevated or atmospheric pressure and be carried out both at room temperature or at reduced or elevated temperature of the product. During the irradiation and/or between the irradiation and the stretching the gel articles are preferably kept in an inert practically oxygen-free environment.

Either during or subsequent to the irradiation, the filaments, films or tapes are stretched (i.e. drawn) at elevated temperatures, preferably above 75° C., but in that step of the process the stretching will preferably be done somewhat below the melting point and/or the dissolution point of the polyethylene; if higher temperatures are used the mobility of the macromolecules may be so high that the desired degree of orientation in the final product may not be achieved, or drawability may even be destroyed. In this connection, the internal intramolecular exothermic effects in temperature resulting from the stretching of the filaments, films or tape must also be taken into account. At high stretching speeds the temperature in the filaments may strongly increase thus care should be taken to avoid that the actual filament temperature comes near to or, indeed, to exceed the melting point of the filament, either at the pre-drawn, partially drawn or nearly fully drawn stage.

The filaments, films or tapes can be conveniently brought to the stretching temperature by passing them into a zone containing a fluid medium, gaseous or liquid, kept at the suitable desired temperature. A tubular oven with air or nitrogen as gaseous medium is very suitable, but liquid baths or any other appropriate device can be used also.

During the stretching operation, the solvent present will be separated off from the filament, film or tape. This is preferably promoted by appropriate additional measures, such as removal or carrying off the solvent vapors by passing a hot gas or air stream along the filament, film or tape in the stretching zone, or by stretching in a liquid batch having an extractant for the solvent, which extractant may optionally be the same as the solvent. The final drawn or stretched filament, film or tape must be at least substantially free of solvent and it is an advantage for conditions to be so chosen that this state is at least substantially reached already at the beginning or in the stretching zone.

Advantageously, the total stretch ratio is at least 15. Preferably, this stretch ratio is between 20 and 40 when stretching tubes, and at least 40 when stretching, e.g., fibers or tapes.

Moduli (E) and tensile strengths are calculated herein by means of strength/elongation curves as determined at room temperature by means of an Instron Tensile tester, at a testing speed of 20% per minute, or in the case of tapes or films 10% per minute, and reduced to the original cross section of the filament, tape or film sample.

In the present process high draw ratios can be employed. Preference is given to stretching the filaments and tapes or uniaxially-drawn films by a factor of at least $$\frac{12 \times 10^6}{\overline{M}_w} + 1$$

wherein $\overline{M}_w$ is the weight-average molecular weight of the polyethylene. Advantageously, the filament, tape or film is stretched by a factor of at least $$\frac{14 \times 10^6}{\overline{M}_w} + 1$$

The novel filaments, tapes or films provided by this invention are suitable for many applications.

Filaments can be used as reinforcement in many materials that are known to be reinforced with fibers or filaments and for all applications in which a small weight accompanied by a great strength with low stretch is desirable such as, for instance, rope, nets, filtercloths, sails, etc.

The tapes according to this invention are suitable for many applications. They can be used a reinforcement in many materials that are known to be reinforced with fibers or tapes and for all applications in which a small weight accompanied by a great strength is desirable such as, for instance, magnetic tapes, rope, etc.

The films according to the invention are also suitable for many applications. They can themselves be cut to form strong bands, ribbons, tapes. They can be used as reinforcement in many materials that are known to be reinforced with films or ribbons and for all applications in which a small weight combined with great strength is desirable such as, for instance, audiovisual or magnetic tapes, tapes for medical uses, packaging films, protective sheeting, substrates for adhesives, etc.

The articles thus obtained show a low creep, a high abrasion resistance, and an extremely high shrink ratio upon heating. So it has been found that when heating said articles to a temperature near to or above the melting point of the polyethylene used (e.g., heating to 140-200° C.), shrink ratio's of e.g., up to and over 100 in the case of e.g., filaments and tapes are obtained. The articles according to the inventions therefore are very suitable for e.g., connecting, covering, tightening of various articles and materials. Furthermore, the filaments according to the invention are particularly suitable for weaving into fabrics.

If so desired, a minor amount of the conventional additives, stabilizers, fiber treating agents and the like can be incorporated in or on the filaments, for instance in amounts of 0.1-10 wt % with respect to the polyethylene.

The invention will now be further elucidated in the following illustrative examples without, however, being limited to the same.

EXAMPLE 1

A high-molecular linear polyethylene of the Hostalen GUR 412 grade of the firm of Ruhrchemie/Hoechst having a weight-average molecular weight of about $1.5 \times 10^6$ was dissolved in decaline (a mixture of cis and trans decalin of the firm Baker) at about 160° C. to form a 3 wt. % solution.

The solution was spun at 150° C. through a spinning plate having apertures with a diameter of 1 mm and a linear rate of 4 meters per minute.

The spun filaments were then passed through a water bath and subsequently through a solvent extraction bath containing trichloroethylene. The thus solvent-extracted filaments were then passed through an inert nitrogen environment, under the scanner of an HVE electron accelerator with a voltage of 3 MV. During this irradiation process a total dosage of 3 MRAD was applied. After the irradiation the fibers were subsequently stretched while passing through an oven and then afterstretched on a hot plate with a gradient of increasing temperature of from 140-152° C. A total draw ratio of 40 could easily be achieved and even higher ratios could be reached.

The filaments thereby obtained, using a total draw ratio of 40 times, had a titer of 9 dtex/filament, a tensile strength of 2.9 GPa and an E-modulus of 95 GPa (measured at room temperature by means of an Instron at a testing speed of 20% per minute).

The tensile creep properties of these filaments were determined using a dead-loading apparatus. A sample of length between 50 and 100 mm was mounted vertically in a constant temperature chamber. The strain as a function of time was recorded by means of a linear displacement transducer connected to a chart recorder. The linear creep rate or plateau creep rate is the slope of elongation vs. time curve as described in ref. I.M. Ward and M.A. Wilding, Journal of Polymer Science, Polymer Physics Ed. 22, 561, 1984.

The linear creep rate of these filaments were tested at a load of 0.6 GPa at 23° C. and the creep rate found was $5 \times 10^{-7}$ sec-1 (0.0000005 reciprocal seconds). At 75° C. under a load of 0.2 GPa., the elongation measured after 100,000 seconds of the filaments obtained was only 5%.

COMPARATIVE EXAMPLE 1

Filaments from the same polyethylene were produced under exactly the same conditions as are described in example 1, except that they were not irradiated. These filaments had substantially the same titer, tensile strength and E-modulus as indicated in example 1.

However, determination of creep by the same method, after being subjected to a load of 0.6 GPa at 23° C., resulted in a creep rate of $28 \times 10^{-7}$ sec$^{-1}$ (0.0000028 reciprocal seconds). Under a load of 0.2 GPa at 75° C., an elongation of 11%, for 100,000 seconds, was observed, twice as much as in Example 1.

EXAMPLES 2-4

The process according to example 1 was repeated three times, but with the radiation dosage increased to respectively 5, 7 and 10 MRAD.

It was found that the filaments obtained at dosage levels of 5 and 7 MRAD, a draw ratio of 40 could still be realized. The tensile strength was 2.8 and 2.6 GPa, respectively. The creep properties of these filaments were again determined at a load of 0.2 GPa for 100,000 seconds at a temperature of 75° C., and the respective elongations were 4% and 1.5%. The creep properties of these filaments were also determined at a load 0.6 GPa at 23° C. and the respective creep rates were found to be: $2 \times 10^{-7}$ sec$^{-1}$ (0.0000002 reciprocal seconds) whereas the 7 MRAD sample showed a creep rate of practically zero in the time span of the experiment (about 10 days).

With the filaments prepared under these conditions, and treated at a dosage of 10 MRAD, the useful draw ratio decreased to about 30. At the applied dosage of 10 MRAD and said draw ratio the properties of these fibers were inferior as to tensile strength 2.3 GPa, E-modulus 80 GPa) to stretched non-irradiated fibers and also to the stretched (up to and including 7 MRAD) irradiated fibers prepared from the same starting polyethylene, but nonetheless superior to filaments described in the prior art, e.g. European Pat. Application 0 115 192, in other characteristics.

It will, however, be appreciated that the filaments spun through apertures of different dimensions, and/or of different polyethylene compositions, will be suitably irradiated at different respective levels of MRAD for optimized combinations of properties. The selection of the appropriate level of irradiation for a given polyethylene stating material and filament dimension can be determined by those skilled in the art by simple suitable testing experiments according to the principles stated above.

EXAMPLE 5 (COMPARATIVE TAPE EXAMPLE)

A 5 %-(wt) solution in decaline of high-molecular polyethylene of the Hifax-1900 (Hercules) grade having a weight-average molecular weight of about $2 \times 10^6$ (n decalin 135° C.=18.5, Fliesswert N/mm2=0.32) was converted into a tape at about 180° C., via a kneader provided at its end with a calibrating device with a rectangular slit-shaped opening, dimensions $2 \times 20$ mm, which tape was subsequently passed into a water bath, upon which the solution was transformed into a gel, opaque in appearance but with sufficient mechanical rigidity to be further conveyed via a roller system. The resulting gel tape, which still contained virtually all solvent, was pre-stretched in an oven at a temperature of about 90° C. at a stretch ratio of about 10, in which process most of the solvent was removed via forced syneresis during the stretching process in combination with the hot gas stream in the oven during this pre-stretching.

The prestretched tape was subsequently after-stretched on a Schwabenthan stretching device, type A 3851. The stretching device had been modified by providing it with hot plates with temperature controls. The after-stretching was Carried out in a temperature gradient having a top temperature of 155° C.

With a total draw ratio (including prestretching) of 40, tapes were obtained whose properties included the following (measured at room temperature):
E-modulus 90 GPa
tensile strength 2.3 GPa The creep properties of the resulting tapes/ribbons were next measured at elevated temperature (75° C.) at a load of 0.2 GPa. The elongation measured after 100,000 seconds was 12%.

Further, tapes from the process of this example exhibited increased fibrillation tendencies at higher degrees of stretching.

EXAMPLE 6

The process of example 1 was repeated except that now the gel tape resulting from the quenching in water, was first passed through a dichloromethane bath for extraction of solvent (decalin) and that the extracted tape was then subsequently irradiated in an inert nitrogen environment under the scanner of an HVE electron accelerator with a voltage of 3 MV. In the irradiation process a total dosage of 3 MRAD was applied. After irradiation the tapes were then after-stretched on the Schwabenthan stretching device to a total draw ratio of about 35. At this draw ratio the mechanical properties obtained continued to be the same as those described under example 5, i.e. an E-modulus of 90 GPa and a tensile strength of 2.3 GPa.

The creep properties of these pre-irradiated tapes were, however, very different. At a load of 0.2 GPa measured at 75° C., in conformity with the conditions mentioned in example 5, the elongation after 100,000 seconds was now only 4 %. Moreover, the pre-irradiated tapes exhibited a substantially decreased fibrillation tendency.

EXAMPLE 7

The process of example 6 was repeated, but now with a dosage of irradiation of 7 MRAD. Again, the E-modulus about 90 GPa was retained with a tensile strength of 2.3 GPa. However, now the creep level of the tapes was only 1.5%.

EXAMPLE 8

The process of example 6 was again repeated, but with paraffin used as solvent, and direct irradiation of the gel tape was effected before solvent extraction, along with a comparative experiment using no irradiation, but otherwise identical conditions.

The results are shown in the following table:

| dosage (MRAD) | draw ratio | E-modulus (GPa) | strength (GPa) | creep 75° C. 0.2 GPa load 100,000 sec. |
|---|---|---|---|---|
| 0 | 40 | 85 | 2.3 | 13% |
| 3 | 40 | 80 | 2.1 | 3% |
| 6 | 40 | 85 | 2.3 | 1% |

EXAMPLE 9

A 4 wt. % solution in decaline of high-molecular polyethylene of the grade of Hostalen GUR 10 412 (Ruhrchemie/Hoechst) having a weight-average molecular weight of about $1.5 \times 10hu 6$ (n decalin 135° C.=15, Fliesswert N/mm2=0.24) was pressed at about 180° C. via a gear pump through a slit-shaped opening having a rectangular shape with dimensions of $2.5 \times 30$ mm. The extrudate was passed into a water bath of 50° C., in which process the clear viscous solution was transformed into a gel-like substance having sufficient rigidity for it to be passed via a roller system into an extraction batch containing trichloroethylene. After extraction and pre-drying the tapes were irradiated with electrons in conformity with example 6 and then after-stretched via a Schwabenthan stretching device in conformity with the procedure of example 5.

The results are shown in the following table, including one non-irradiated comparative experiment:

| dosage (MRAD) | draw ratio | E-modulus (GPa) | creep 23° C. 0.4 GPa load 100,000 sec. |
|---|---|---|---|
| 0 | 45 | 90 | 13% |
| 3 | 40 | 80 | 3% |
| 6 | 40 | 85 | 1% |

EXAMPLE 10 (COMPARATIVE FILM EXAMPLE)

A 5 %-(wt) solution of high-molecular polyethylene of the Hifax-1900 (Hercules) grade with a weight-average molecular weight of about $2 \times 10^6$ in paraffin having a temperature of about 180° C. is poured out on a cooled conveyor belt to form a gel product with a thickness of about 2 mm and a width of about 100 mm. The gel film thus obtained was passed through a bath of trichlorethylene for removing the solvent and was subsequently stretched in an oven with a temperature gradient (120–145° C.), at variable stretch ratios.

At a stretch ratio of 15x films were thereby obtained having a E-modulus (measured at room temperature) of 22 GPa. At respective draw ratio of 25 and of 30, the E-modulus was respectively 40 and 52 GPa.

The creep properties of the thus-obtained (52 GPa) film was measured at about 75° C., at a load of 0.2 GPa. The elongation measured after 100,000 sec. was at least 10–11 %.

Films made by this process showed a strong fibrillation tendency which increased at the higher draw ratios.

EXAMPLE 11

The process of example 10 was repeated with the exception that the gel film obtained was irradiated after extraction and before the stretching in an inert nitrogen environment under the scanner of an electron accelerator of the HVE type having a high voltage of 3 MV. In the irradiation a total dosage of 3 MRAD was applied.

These resulting films—after stretching—had the same modulus properties (about 50 GPa) as in Example 10. However, the creep was substantially lower. The elongation measured as in Example 10 was less than 5%. Further, the irradiated films, showed a strongly reduced tendency towards fibrillation.

EXAMPLE 12 (COMPARATIVE FILM EXAMPLE)

A suspension of 15 wt. % of Hifax-1900 (Hercules) having a molecular weight Mw of about $2 \times 10^6$ (n decalin, 135° C.=18.5) in decalin (a mixture of cis- and trans decalin from Baker) was fed to an extruder. During feeding, the suspension was stirred continuously to prevent settling. The extruder was of the type ZSK produced by Werner and Pfleiderer and comprised two co-rotating screws; wherein L/D=27 and the diameter of each of the twin screws is 30 mm. The temperature was 25 set at the extruder head at 180° C. and a rotational speed of 200 r.p.m. were applied during the extrusion process.

The extrudate was passed through a water bath whereupon a solidification took place and a gel-film was obtained with dimensions of about 2 mm (thickness) and 120 mm (width). This gel-film was led through an extraction bath containing dichloromethane and after extraction of the decalin the film was drawn bi-axially within a temperature range between 120–145° C. The draw ratio in the extrusion direction was 5–7x and perpendicular to the extrusion direction was about 3–4x. A biaxially drawn film was obtained of thickness about 10 micrometer. The film was not homogeneous and properties such as tear-strength and impact strength showed a large scatter depending on the measuring position on the film.

Heating the film to about its melting point, about 145° C., resulting in partly in shrinkage and partly in melting followed by hole formation. The film therefore is not useful for application where shrinkage is important as in wrapping.

EXAMPLE 13

The procedure of Example 12 was followed except that the gel-state film was irradiated before drawing. After irradiation, with 5 MRAD dose, drawing bi-axially could be performed, even above the melting point, for instance at 160° C., resulting in a homogeneous film product. This film shows good shrinkage characteristics when heated after drawing, to the same amount as in Example 12, even when the drawing was done somewhat above the melting point. Moreover the high impact strength, as tested by the falling dart method, was 120–200 kJ/m.

Thus, a further feature of the present invention, especially in regard to the film embodiment thereof, is that the films resulting from the practice of this invention may be biaxially-stretched. The film can be made by the techniques already described by extruding the gel through Slit-shaped apertured into a cooled box, forming a film of for instance 20 cm. in width and 100 m thick. Such a film may be stretched, for instance, seven times both lengthwise and breadthwise at 125° C. to form a film having a width of about 140cm and a thickness of about 2 m. Alternatively, the gel may be extruded or spun through an annular aperture to form a tube, and the tube may then be blown with air directed therethrough, by methods already known to the ar=, to form a greatly bi-axially stretched, ultra thin polyethylene film. Such films, retaining valuably high tensile strengths and moduli, may thus be formed with extremely low thicknesses, for instance below 1 m. alternatively, other methods can also be employed for forming the film, for instance pouring the solution out on, for instance, a belt or a roller, which may then be rolled out or calendered further, and then stretched.

EXAMPLE 14

To the feed zone of a co-rotating twin-screw extruder, the thermostat temperature of which zone was set at 80° C., a finely divided ($\sigma 50 = 90$ μm), high-molecular polyethylene of the Hostalen GUR 412 grade (of the firm of Ruhrchemie/Hoechst) with a weight-average molecular weight ratio of about $1.5 \times 10^6$ and decalin were supplied in a polyethylene : decalin weight ratio of about 1:30 The chosen extruder was of the ZSK type of the firm of Werner and Pfleiderer; L/D=27, provided with $2 \times 30$ mm screws composed of alternate conveying and kneading elements.

The temperature in the extruder was 170–180° C., the speed about 220 revolutions per minute.

After a residence time of 2.7 minutes the mixture obtained was carried off via an aperture (diameter 1 mm) at the other end of the extruder into a water batch, in which operation a solvent-containing gel filament was obtained having a homogeneous structure, which gel filament was passed through an extraction bath of dichloromethane. Thereafter, the extracted filaments were passed, in an inert nitrogen environment, under the scanner of an HVE electron accelerator with a voltage of 3 MV. In this irradiation process a total dosage of 4.5 MRAD was applied.

Subsequently, the filaments were stretched on a Schwabenthan stretching device, type A 3851 at a temperature of about 140–152° C. with a total stretch ratio of about 60 times.

The stretched filaments were thereafter woven to form a fabric, which was air-heated to about 175° C. The fabric obtained shrunk in a ratio of about 58 times.

EXAMPLE 15

In the same way as in Example I a 3 %(wt) suspension of Hostalen GUR 412 in decalin was treated in the extruder, which was provided with a slit-shaped outlet ($2 \times 20$ mm).

After quenching and extracting the resulting gel tapes were subjected to electron irradiation (5 MRAD), and stretched in a stretch ratio of 65 times. The resulting tapes were air-heated to 160° C. for a few seconds and showed a shrinkage of above 63 times. Example 16

The process of Example 15 was repeated on the understanding that the irradiation dose was 7,5 MRAD and the stretch ratio 75 times.

Upon air-heating (190°) the tapes showed a shrinkage with a factor of about 72 times.

EXAMPLE 17

The process of Example 14 was repeated on the understanding that a 5 %-(wt) suspension of Hostalen GUR 412 was converted into a gel-fiber, which after irradiation in the gelstate (6 MRAD) was stretched (stretch ratio 50 times), and woven to a fabric.

Upon heating (175°) the fabric showed a shrinkage of about 48 times. EXAMPLE 18

A 2 %-(wt) solution of high-molecular polyethylene of the Hifax-1900 (Hercules) grade having a weight-average molecular weight of about $2 \times 10^6$ in decalin was spun at about 150° C. via a spinning plate with apertures having a diameter of 1 mm.

After quenching in water and extraction in trichloroethylene the gelfilaments were subjected to electron irradiation (5 MRAD), stretched (stretch ratio about 110 times) and woven to a fabric.

Upon air-heating (185° C.) the fabric showed a shrinkage of more than 100 times.

EXAMPLE 19

In the same way as in Example 15 a 10 %(wt) suspension of Hifax-1900 in paraffine was treated in the extruder which was provided with a tube-shaped head (outer diameter about 14 mm, inner diameter about 12 mm).

The tube-shaped article leaving the extruder was quenched, extracted (trichloroethylene), electron irradiated (5 MRAD) and drawn in a draw ratio of about 20 times.

Upon heating to about 170° C. the tube shrank with a shrink ratio of about 18 times.

EXAMPLE 20

The process of Example 19 was repeated on the understanding that a 5 %-(wt) suspension of Hifax-1900 in paraffine was used, and the geltube after irradiation (7 MRAD) was stretched in a stretch ratio of about 30 times.

Upon air-heating (180° C.) the shrink ratio was about 28 times.

It will be appreciated from the foregoing discussion that the techniques of this invention which permit the high draw ratios while retaining very high tensile strengths and moduli, but with the radiation-induced cross-linking and/or branching of the polyethylene molecules themselves, will provide materials which have useful heat shrinking characteristics. For instance, films and stretched in one of the manners described above and quenched to room temperature, will upon being raised to a suitable relaxation temperature exhibit remarkably retractive, shrinking characteristics, of excellent levels, and which are of considerable commercial significance for the resulting product as will be immediately understood and appreciated. Such heat-shrinking characteristics are, of course, also exhibited by the products of this invention in the form of tapes, filaments or even tubes.

It will be understood that, as used herein, irradiation refers to the use of high-energy (ionizing) radiation from electron beam and gamma ray sources (commonly employing $Co^{60}$ sources). Generally speaking, because gamma rays, as from a $Co^{\alpha}$ source, are limited to about 1-2 MRAD/hour (1 MRAD = 104 Joules/kg), it is preferred and satisfactory to use electron beam irradiation in the practice of this invention, as a practical matter, because relatively thin layers of material are being subject to the irradiation and the electron beam penetration is sufficient and may be used at much higher energy levels. Suitable electron beam radiation equipment is commercially available as, for instance, from High Voltage Engineering or Radiation Dynamics. By employing suitable cathode voltage, production speeds can be very high (depending upon the desired radiation dose employed), and up to several hundred meters per 20 minute.

In a sense, the high tensile strength and E modulus of the subject fibers and/or tapes and films may be regarded or referred to as "short term properties", whereas the properties such as improved creep resistance and high temperature performance and high heat shrinkage characteristics of the novel fibers, tapes and films provided by this invention may be regarded more as "long term properties". As will be seen from the descriptions herein, these long term properties are significantly enhanced by the use of an irradiation treatment, according to this invention, applied to the ultra high molecular weight polyethylene in the gel state, and before drawing. Moreover, this occurs without any substantial reduction or loss in the so-called short term properties. This is in sharp contrast to the observations in the past of the results of irradiation of already drawn fibers and tapes of polyethylene.

It will also be recognized that the improved properties described in the foregoing examples indicate that this invention provides novel products which have novelty in their chemical composition. Clearly, the composition of these filaments, types or films is no longer what is normally called polyethylene in the sense of the normal linear polyethylene of current commerce. Instead, the irradiation treatment appears to have effected a significant change and that this is indeed the case is demonstrated by the following additional investigations of the products of this invention and the results thereof.

Figure 2:
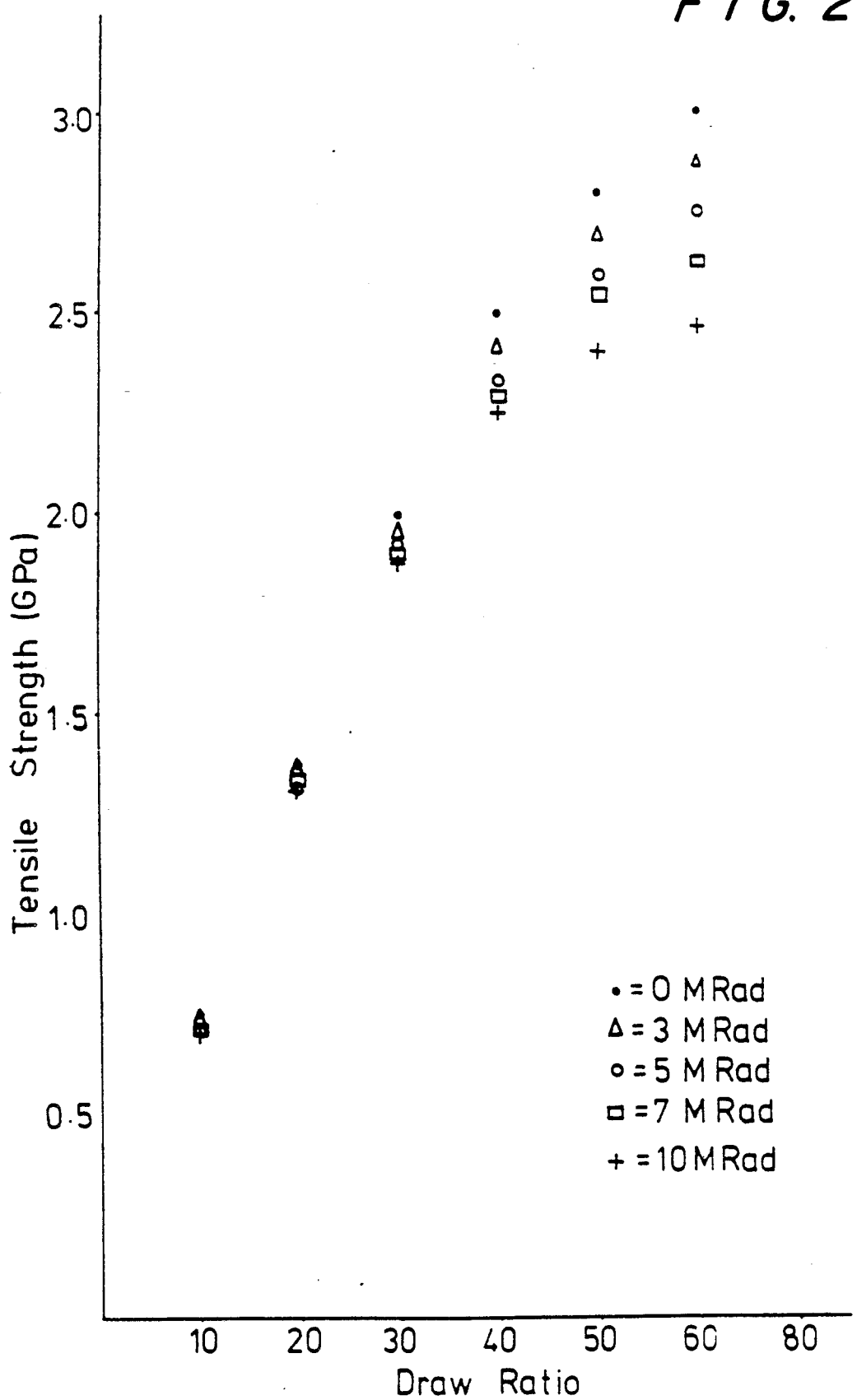
FIG. 2 shows results plotted for tensile strength against Draw Ratio.

To first illustrate the retention of the tensile strength and E-Modulus characteristics, as well as, surprisingly, the durability of the irradiated products of this invention, in comparison to non-irradiated counterparts, reference is made to FIGS. 1 and 2 herewith.

In FIG. 1, there is plotted the E-Modulus of tapes prepared from 1.5% solution of Hostalen GUR-412 and which had been irradiated at varying dose rates and then stretched at varying draw ratios, as indicated in the figure. It will be seen that there is at most only slight loss of E-Modulus characteristics, and only at the higher draw ratios for the higher radiation dosages.

Similarly, in FIG. 2, results are plotted for tensile strength against Draw Ratio, this time for filaments spun from a 3% solution of Hostalen GUR-412. The initially spun fiber had a diameter of about 1.5 mm which reduced to about 0.3 mm after solvent removal. The fiber diameter after drawing generally confirmed to the formula $\lambda^{-\frac{1}{2}} \times 0.3$ mm, where $\lambda$ is the draw ratio. Here again it will be seen that there is either no loss or only slight loss of tensile strength for the irradiated filament as compared to the non-irradiated filament (and then only at higher draw ratios and higher radiation dosages).

This substantial retention of these characteristics would not have been predicted from past experience from irradiating fibers, films and tapes where generally the radiation effect was to cause a very substantial deterioration of drawability.

The melting behavior of the new products is even more demonstrative of the fact that a novel chemical composition is present in the articles provided by this invention.

A well-known method to study the thermal behavior of materials is by D(ifferential)-S(canning)-C(alorimetry). In these dynamic experiments the samples are heated in encapsulated cells in sample holders and transitions thereof, either endothermic or exothermic, are recorded as a function of time with respect to an inert reference (for example a metal or just empty cell). In the case of polymeric materials, melting takes place over a relatively broad temperature range in comparison with low-molecular weight crystalline materials.

To conduct correct measurements a standard procedure was adopted as follows. One way to study the fibers or tapes is to have them embedded in an epoxy matrix to provide constraints during heating and to prevent that above the melting temperature the fiber or tape will shrink to its original length before drawing.

The fiber and/or tape is thus embedded into a standard epoxy e.g. Eurepox 730 or Epikote 828, and cured at temperatures below 135° C. to prevent melting of the PE fibers/tapes. The amount of matrix is not critical but to avoid thermal lag in the DSC apparatus the ratio of fiber/tape to matrix is 1/1 or higher. The choice of the specific epoxy or polyester is not material provided that during heating in the temperature range of interest no thermal transitions of the matrix are present. A heating rate of 10° C./min. is adopted as standard and a sample weight of about 10–20 mg. After heating to 170° C., the sample is cooled (quenched) in the apparatus to room temperature as fast as possible and after re-scanned to 170° C.

Figure 3:
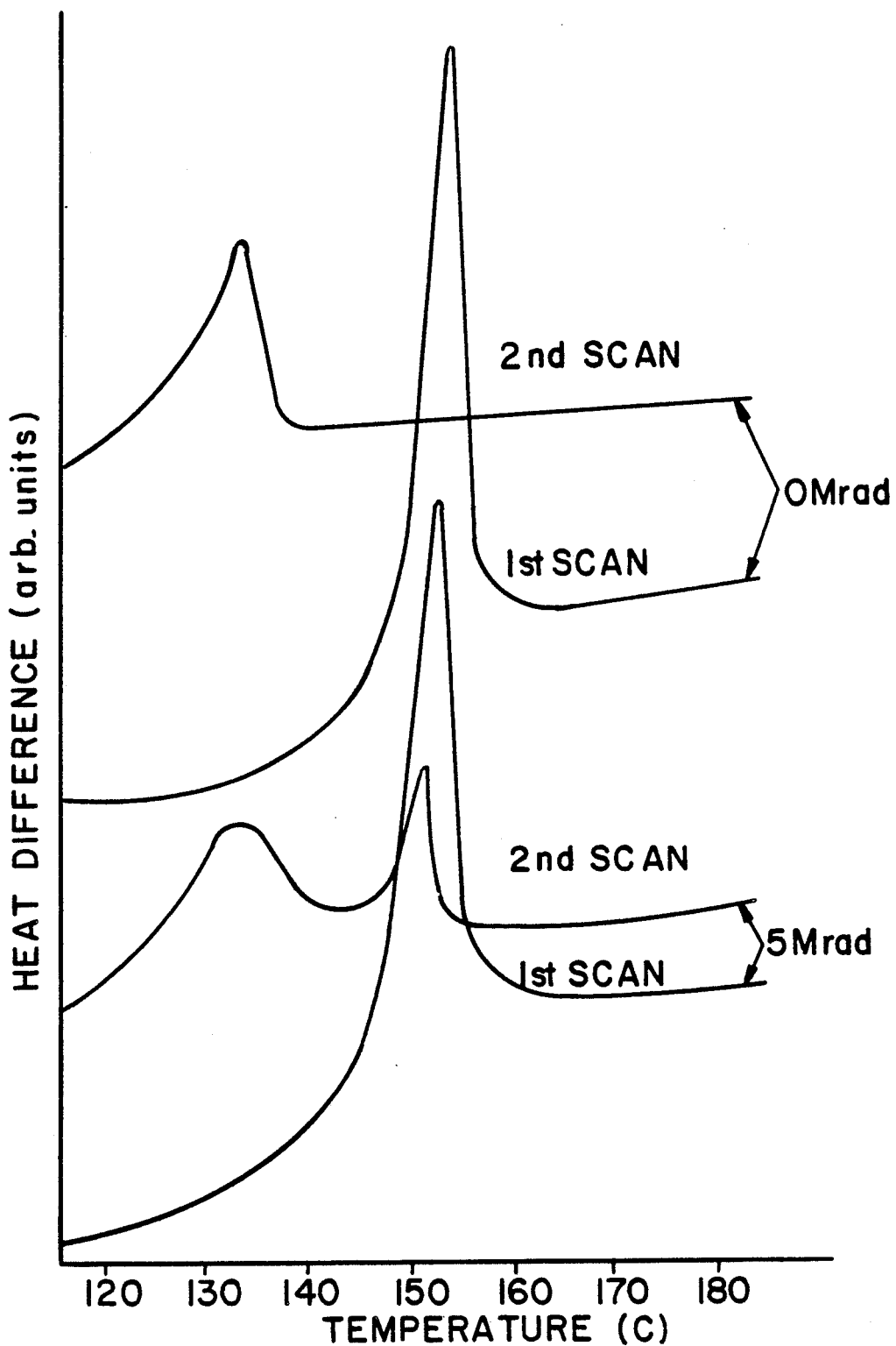
FIG. 3 shows comparative DSC melting curves.

In FIG. 3, comparative DSC melting curves are shown, for two tape samples. The tapes as extruded from a 1.5 wt. % solution of Hostalen GUR 412 had a width of 20 mm and were 2 mm thick. After solvent extraction, the dimensions were about 20 mm by 0.1 mm. After drawing at a draw ratio of 40x these dimensions were then about 10 mm×0.005 mm. One tape received no radiation; the other tape was irradiated at 5 MRAD before drawing, according to this invention. Next the DSC melting behavior of these tapes was studied, using a heating rate of 10° C./min.

In FIG. 3 curves A and B are for the non-irradiated tape and curves C. and D are for the irradiated tape. For each tape, after the first melting, the sample was cooled and then re-scanned in the same manner. It will be seen that the non-irradiated tape shows a main melting point at about 155° C. on the first scan, but on the second scan that melting point disappears and a melting peak of different shape appears just above about 135° C., indicative of isotropic polyethylene.

With the irradiated tape of this invention, curves C. and D, while the first scan again produced the endotherm at about 155° C., but the second scan by sharp contrast produced two peaks, one at about 135° C. and the second being a retained endotherm peak at about 155° C.

These curves are typical and characteristic for the products of this invention. Generally the ratio of the endotherm areas for the 155° C. melting point will depend upon the MRAD dose, but typically at least about 20% of this area will be retained for the products provided by this invention. The retention of such area is again demonstrative of a significant change of chemical composition.

Figure 4A:
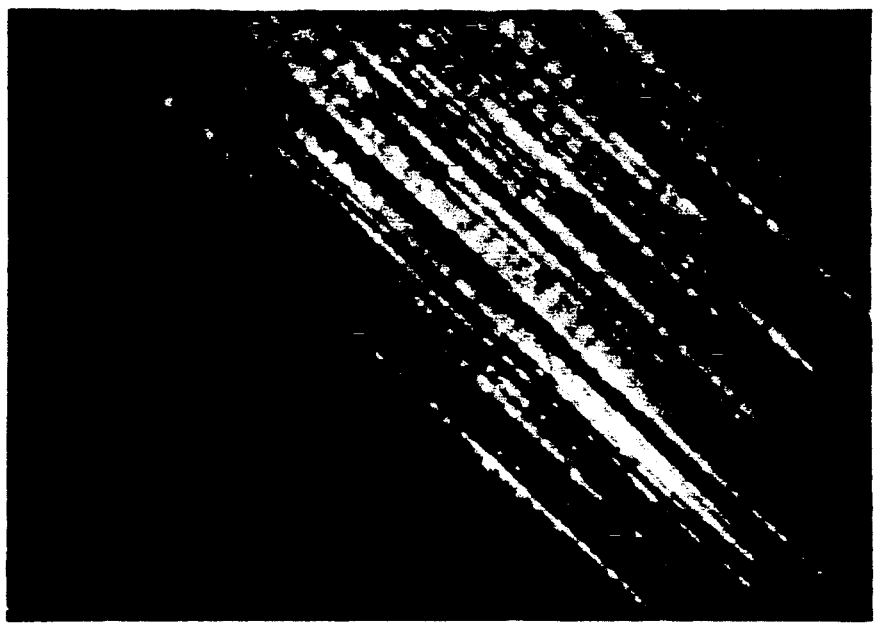
FIGS. 4A and 4B show optical micrographs for a tape which received no radiation.
Figure 4B:

This is indeed confirmed by the optical micrographs of FIGS. 4 and 5 of the attached drawings. Here, in FIG. 4A, "T=23° C.", a photomicrograph of the tape in the epoxy matrix before heating is seen. In FIG. 4B, "T=164° C.", the same tape is shown after heating to 164° C. Here the polyethylene has entirely melted and formed droplets (only the replica of the tape surface is still seen in the epoxy matrix). This tape had received no radiation.

Figure 5A:
FIGS. 5A, 5B, and 5C show optical micrographs for a tape which received 5 MRAD.
Figure 5B:
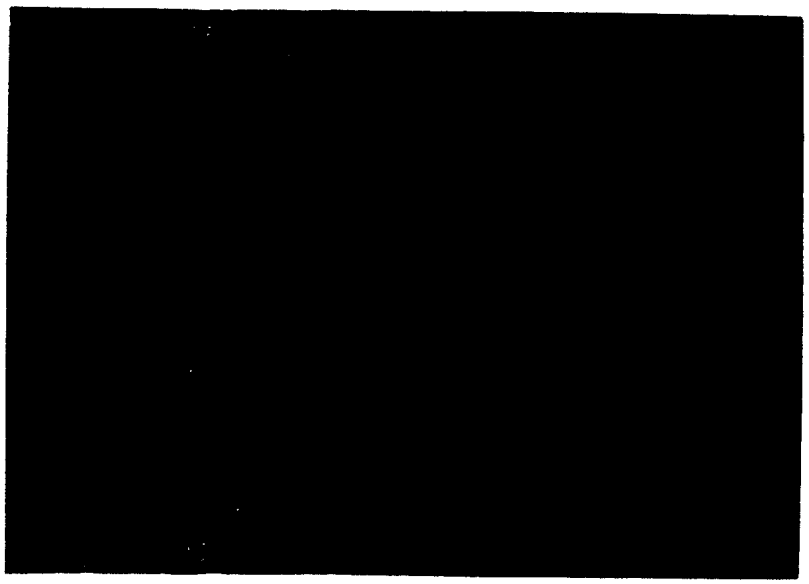
Figure 5C:

By sharp contrast, in FIG. 5, with the same tape but which had received a dose of 5 MRAD, it will be noted that the tape retains its structural form, as initially shown in FIG. 5A, "T=23° C.", and after heating to "170° C.," FIG. 5B, and even in FIG. 5C, after heating up to "T=220° C." (Note: the dark spots or circles in both FIGS. 4 and 5 are simply contact points in the matrix and are irrelevant to these observations).

Consistent with the above experimental observations, it has also been observed that after heating and achievement of thermal equilibrium above 170° C. in the constrained state, the radiated and drawn products provided by this invention substantially retain the x-ray defraction pattern which typically corresponds to oriented, crystallized polyethylene.

Here, again, the evidence seems clear that a significantly different, novel chemical composition has been produced by this invention for otherwise similar melting point behavior should have been observed.

Further tests were made to measure the retractive force as a function of temperature for the irradiated product versus the non-irradiated product.

Figure 6:
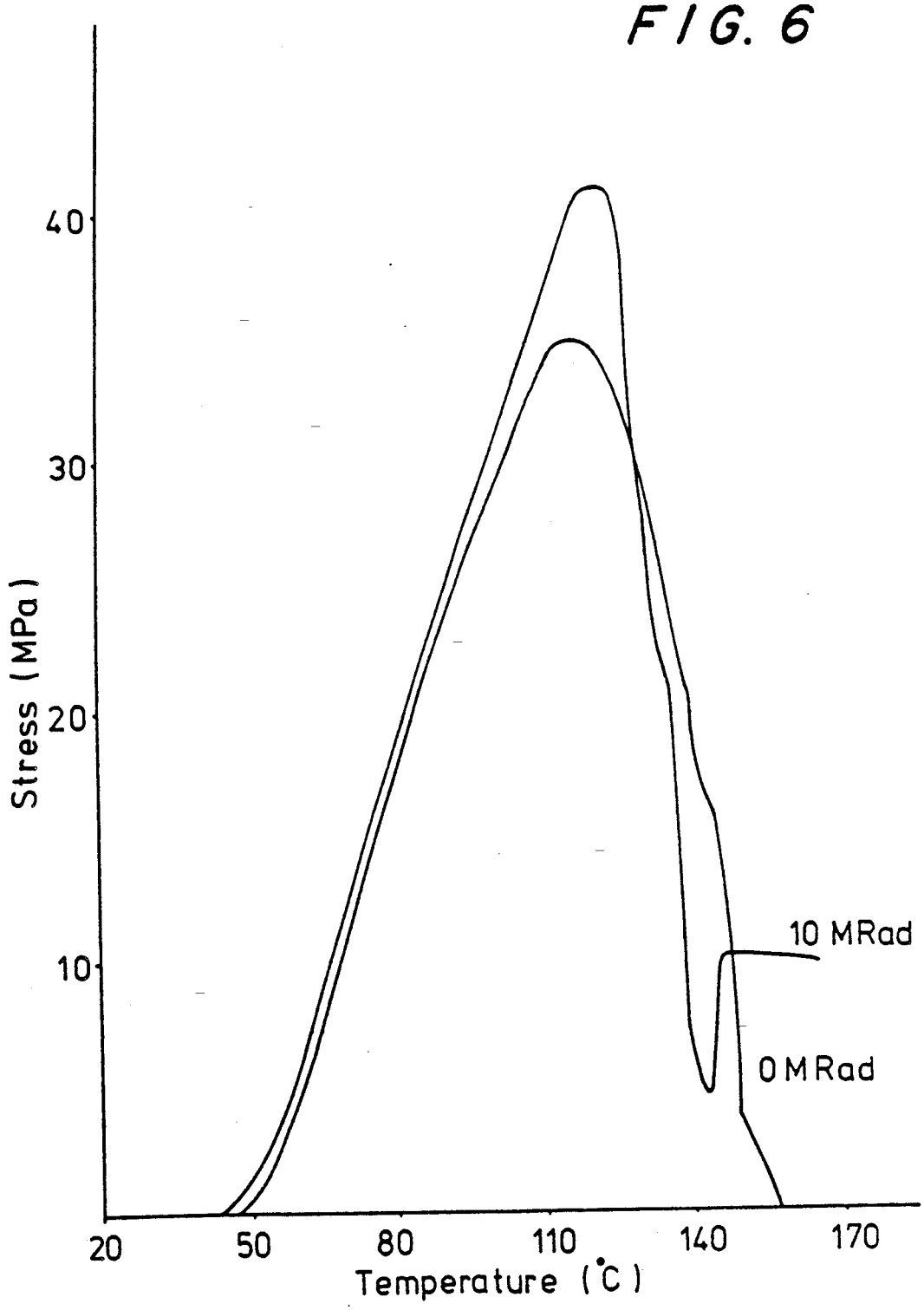
FIG. 6 shows a typical behavior result for two tapes.

FIG. 6 shows a typical behavior result for two tapes, both having an E-Modulus of 90 GPa. The curve marked "0 MRad" is for the non-irradiated drawn tape and demonstrates a zero retractive force above the melting point. By contrast the curve "10 MRad" for the irradiated/drawn tape shows retention of a plateau stress/force even above the melting point. The magnitude of this plateau will of course be dependent on the radiation dose and development of cross-links, but the presence of the plateau is characteristic of and indicative of the irradiated novel filaments, tapes and films provided by this invention.

Further studies of the creep rate (sec.$^{-1}$) have also been made (following the method described in Example I above).

Figure 7:
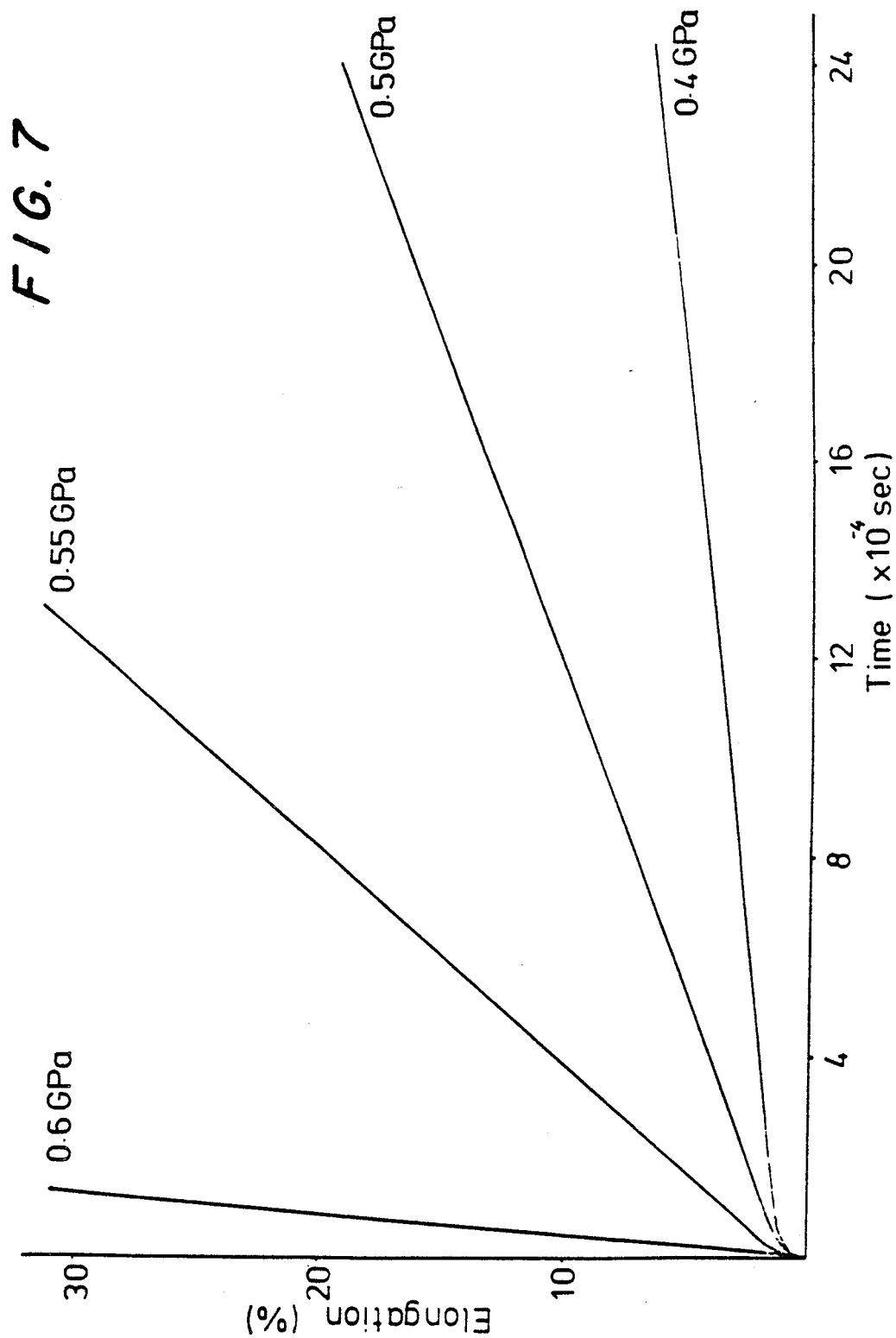
FIG. 7 shows a typical Elongation vs. Time Curve.

FIG. 7 shows a typical Elongation vs. Time Curve measured at varying loads, using in this instance a non-irradiated gel-spun Hostalen GUR-412 tape, drawn 60X, with the indicated load applied at 23° C. It will be noted that after a short induction time the elongation vs. time curve becomes linear; the slope thereof is a measure of the creep rate.

Figure 8:
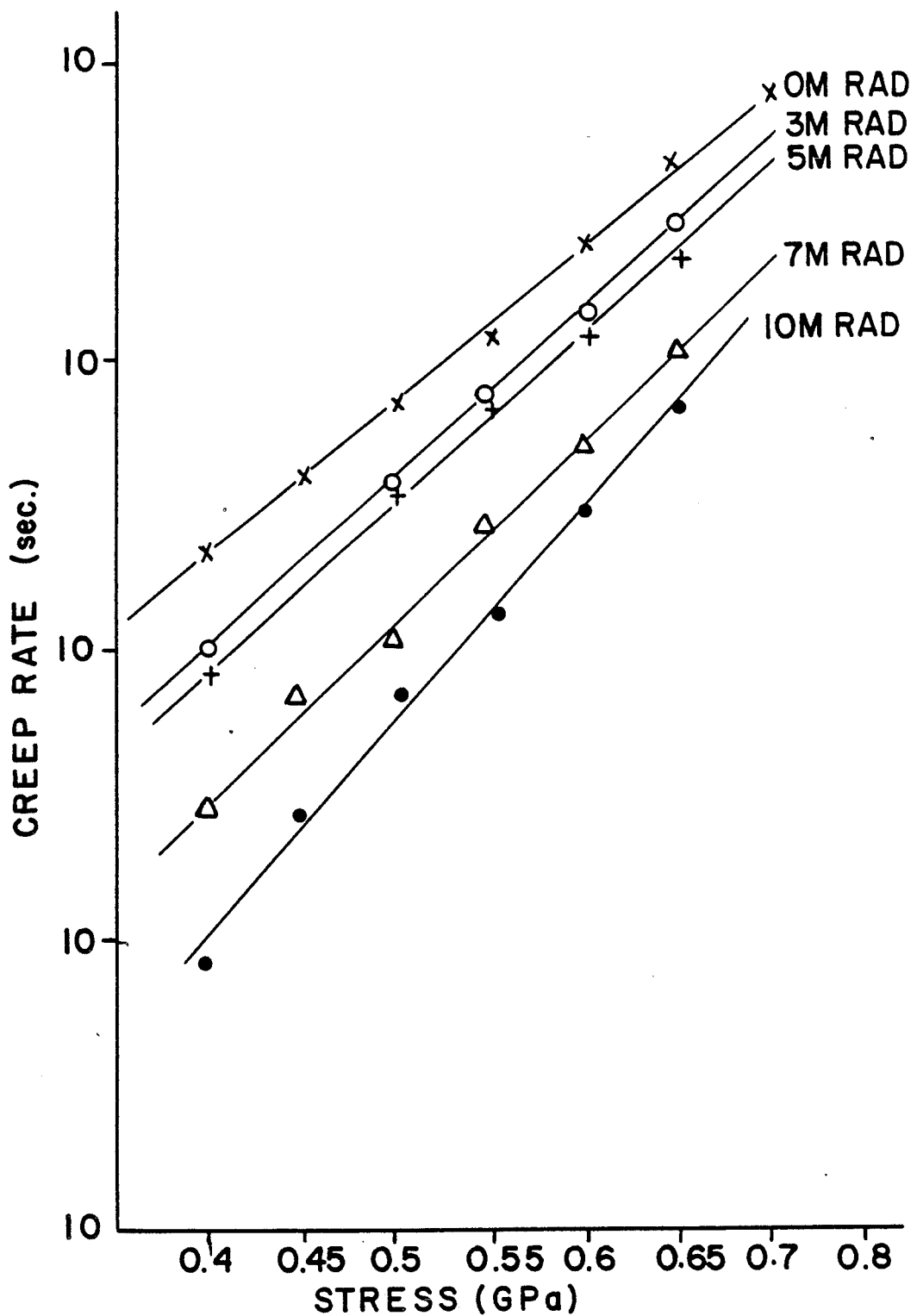
FIG. 8 shows the variation in creep rate with varying amounts of radiation.

FIG. 8 next shows the variation in creep rate with varying amounts of radiation, measured at 23° C. on Hostalen GUR-412 tapes drawn 60X. Note that the creep rate is plotted on a logarithmic scale and from this FIG. 8 it can be seen that the radiated tapes produced according to this invention show up to a 10-fold lower creep rate.

From the curves shown in FIG. 8, the activation volume can also be examined (i.e. the apparent space required to permit one polymer unit or segment to move in a "creep" situation). The Eyring equation adapted for the process of activated flux (ignoring backflow terms) is:

$$\epsilon = \epsilon_0 \exp(-\Delta E/kT) \exp(\Delta V/kT)$$

From the slopes in FIG. 8 the following values are obtained:

| MRad Dose | Activation Volume, (Å)$^3$ |
| --- | --- |
| 0 | 48 |
| 3 | 55 |
| 5 | 55 |
| 7 | 60 |
| 10 | 70 |

As this table shows, with increasing radiation dose, the activation volume correspondingly increases. In view of some uncertainty in quantitatively interpreting these data at this time no direct molecular weight correlation should be made. However, it can be tentatively concluded that due to the radiation-induced presence of crosslinks, and possibly long chain branches, a generally larger average activation volume is required to accommodate the presence of cross-linked or branched, (either tri-or tetra-functional molecules).

Once again the evidence confirms the existence of a novel chemical composition for the products of this invention and that a fundamental modification of the linear polyethylene structure in the starting material has been induced by the particular radiation treatment in the gel state prior to or during stretching of the material.

This conclusion is also further indicated by solubility studies to determine the percentage of insoluble material in the products as a function of radiation. For instance, 50 mg samples of irradiated gel films of Hostalen GUR-412 polyethylene made from a 1.5 wt. % solution in xylene were solvent-extracted with refluxing xylene in a Soxhlet apparatus to a constant weight after vacuum drying under a nitrogen atmosphere at 100° C. (Maximum time 24 hrs.). The resulting insoluble content was determined as follows for variations in radiation dosages, as indicated:

| MRad Dose | Insol. Wt. % |
| --- | --- |
| 3 | 35 |
| 5 | 62 |
| 7 | 70 |

| MRad Dose | Insol. Wt. % |
|---|---|
| 10 | 74 |

These results appear to correlate well with the other observed properties and characteristics described hereinabove.

I claim:

1. A gel-spun, irradiated and drawn, and at least partially cross-linked branched ultra high strength polyethylene article in the form of a film, tape or fiber possessing high shrink properties and exhibiting the following characteristics in combination
    (1) a tensile strength of at least $(2.3-1.3\times10^{-2}D)$ GPa where D is the thickness or diameter of uniaxially oriented tapes and filaments, in $\mu m$, or a tensile strength of at least 0.5 GPa in case of biaxially drawn films;
    (2) a modulus of at least 30 GPa;
    (3) a xylene insoluble content of at least 25%;
    (4) an at least 20% retained peak area under the DSC main melting point curve, upon second heating after an initial heating about 170° C.;
    (5) a retention of a retractive force plateau after reaching thermal equilibrium upon heating the fiber to a temperature above about 170° C.; and
    (6) retention, after heating and reaching thermal equilibrium above 170° C. under restraint, of an X-ray diffraction pattern substantially corresponding to the oriented, crystallized polyethylene.

2. A gel spun and drawn article according to claim 1 which has been mono-axially drawn at or above ratio of at least $$\frac{12\times 10^6}{\overline{M}^w} + 1$$

wherein $\overline{M}^w$ represents the weight average molecular weight of the initial polyethylene used.

3. A gel spun and drawn polyethylene filament having the characteristics defined in claim 1.

4. A gel spun and drawn polyethylene tape having the characteristics defined in claim 1.

5. A gel spun and drawn polyethylene film having the characteristics defined in claim 1.

6. A gel spun, irradiated and drawn polyethylene article according to claim 1 exhibiting a reduced creep rate than would be exhibited by the article if not irradiated.

7. The article of claim 6 wherein said creep rate is reduced by at least about 50%.

8. A gel spun, irradiated and drawn filament according to claim 1 and having a tensile strength of at least 2.1 GPa and a modulus of at leash 60 GPa.

9. A gel spun, irradiated and drawn tape according to claim 1 and having a tensile strength of at least 1.5 GPa and a modulus of at least 60 GPa.

10. A gel spun, irradiated and drawn polyethylene film according to claim 1 which has been biaxially stretched.

11. A gel spun, irradiated and drawn article of polyethylene according to claim 1 which has been stretched to a draw ratio of at least 15.

12. A process for the production of novel irradiated ultra high strength polyethylene filaments, tapes and films which essentially consists in
    (a) forming a solution of a high molecular weight polyethylene
    (b) spinning or extruding said solution through an orifice
    (c) quenching the extrudate from step (b) to a temperature below the gel point of said solution to form a gel-state article in the form of filament, tape or film
    (d) irradiating said gel-state article while in the gel-state
    (e) and drawing or stretching said gel-state article either during or after said irradiation to form a drawn or stretched article composed of at least partially cross-linked or long-chain branched polyethylene molecules having the combination of properties
        (1) a tensile strength of at least $(2.3-1.3\times10^{-2}D)$ GPa where D is the thickness or diameter of uniaxially oriented tapes and filaments, in $\mu m$, or a tensile strength of at least 0.5 GPa in case of biaxially drawn films;
        (2) a modulus of at least 30 GPa;
        (3) a xylene insoluble content of at least 25%;
        (4) an at least 20% retained peak area under the DSC main melting point curve, upon second heating after an initial heating about 170° C.;
        (5) a retention of a retractive force plateau after reaching thermal equilibrium upon heating the fiber to a temperature above about 170° (C.; and)
        (6) retention, after heating and reaching thermal equilibrium above 170° C. under restraint, of an X-ray diffraction pattern substantially corresponding to the oriented, crystallized polyethylene.

13. A process according to claim 12 wherein said irradiation is electron irradiation at a level of from about 1 up to about 10 MRAD.

14. A process according to claim 12 wherein said irradiation is electron irradiation at a level is from about 3 to 7 MRAD.

15. A process according to claim 12, wherein a predominantly oxygen-free environment is maintained during the irradiation between the irradiation and the stretching.

16. A process according to claim 12 wherein said drawing is at a mono-axial draw ratio of at least 15.

17. A process according to claim 12 wherein the mono-axial drawn ratio is at least $$\frac{12\times 10^6}{Mw} + 1$$

wherein $\overline{M}^w$ is the weight average molecular weight of the high molecular weight polyethylene starting material.

18. A process according to claim 17 wherein $\overline{M}^w$ represents at least $4\times 10^5$.

19. A process according to claim 17 wherein $\overline{M}^w$ represents at least $8\times 10^5$.

20. A process according to claim 17 wherein said ratio is at least $$\frac{14\times 10^6}{Mw} + 1$$

21. A process according to claim 20 wherein $\overline{M}^w$ represents at least $4 \times 10^5$.

22. A process according to claim 20 wherein $\overline{M}^w$ represents at least $8 \times 10^5$.

23. A process according to claim 12 wherein said solution has a concentration of from 0.5% to about 40% of high molecular weight polyethylene.

24. A process according to claim 12 wherein said irradiation takes place during the drawing or stretching step at an elevated temperature of at least 75° C. but below the melting point of the polyethylene.

25. A process according to claim 11 wherein prior to irradiation the gel-spun article is substantially freed of solvent by evaporation or extraction.

* * * * *